United States Patent
Harduf et al.

(10) Patent No.: US 12,182,408 B2
(45) Date of Patent: Dec. 31, 2024

(54) STORAGE MANAGEMENT SYSTEM AND METHOD

(71) Applicant: EMC IP Holding Company, LLC, Hopkinton, MA (US)

(72) Inventors: Yuval Harduf, Yehud (IL); Marina Shem Tov, Hod Hasharon (IL); Vitaly Zharkov, Modiin (IL)

(73) Assignee: EMC IP Holding Company, LLC, Hopkinton, MA (US)

( * ) Notice: Subject to any disclaimer, the term of this patent is extended or adjusted under 35 U.S.C. 154(b) by 177 days.

(21) Appl. No.: 17/726,028

(22) Filed: Apr. 21, 2022

(65) Prior Publication Data

US 2023/0342036 A1    Oct. 26, 2023

(51) Int. Cl.
*G06F 3/06*    (2006.01)

(52) U.S. Cl.
CPC .......... *G06F 3/0613* (2013.01); *G06F 3/0659* (2013.01); *G06F 3/0673* (2013.01)

(58) Field of Classification Search
CPC .... G06F 3/0613; G06F 3/0659; G06F 3/0673; G06F 3/067
USPC .................................................. 711/154, 100
See application file for complete search history.

(56) References Cited

U.S. PATENT DOCUMENTS

| | | | |
|---|---|---|---|
| 9,971,548 B1* | 5/2018 | Talwar | G06F 3/0613 |
| 2005/0246393 A1* | 11/2005 | Coates | G06F 3/067 |
| 2013/0227111 A1* | 8/2013 | Wright | G06F 11/3495 709/223 |
| 2015/0269239 A1* | 9/2015 | Swift | G06F 16/27 707/610 |

* cited by examiner

*Primary Examiner* — David Yi
*Assistant Examiner* — Zubair Ahmed
(74) *Attorney, Agent, or Firm* — Brian J. Colandreo; Heath M. Sargeant; Holland & Knight LLP

(57) ABSTRACT

A method, computer program product, and computing system for dividing a total IO flow rate limit between a plurality of storage nodes of a multi-node storage system. A total desired IO flow rate may be determined. Each storage node of the plurality of storage nodes may be queried for a desired IO flow rate, thus defining a plurality of desired IO flow rates. An updated IO flow rate limit may be defined, for each storage node, an updated IO flow rate limit based upon, at least in part, the total IO flow rate limit and the plurality of desired IO flow rates. One or more IO requests may be processed on the plurality of storage nodes based upon, at least in part, the updated IO flow rate limit defined for each storage node and the total desired IO flow rate.

20 Claims, 6 Drawing Sheets

STORAGE MANAGEMENT SYSTEM AND METHOD

BACKGROUND

Storing and safeguarding electronic content may be beneficial in modern business and elsewhere. Accordingly, various methodologies may be employed to protect and distribute such electronic content.

In a multi-node storage system, a host can connect to the storage system through multiple nodes and have all storage objects serviced by each node. However, when IO requests associated with the storage resources are handled by different storage nodes, each storage node is generally aware of some IO flow limit. With conventional approaches, each storage node would apply some limit on its portion of processing data, in such a way that total IO flow of the data on all nodes does not exceed the configured limit. However, these conventional approaches do not allow multiple storage nodes of a multi-node storage system to "know" or adjust its portion of the total IO flow.

Summary of Disclosure

In one example implementation, a computer-implemented method executed on a computing device may include, but is not limited to, dividing a total IO flow rate limit between a plurality of storage nodes of a multi-node storage system. A total desired IO flow rate may be determined. Each storage node of the plurality of storage nodes may be queried for a desired IO flow rate, thus defining a plurality of desired IO flow rates. An updated IO flow rate limit may be defined, for each storage node, an updated IO flow rate limit based upon, at least in part, the total IO flow rate limit and the plurality of desired IO flow rates. One or more IO requests may be processed on the plurality of storage nodes based upon, at least in part, the updated IO flow rate limit defined for each storage node and the total desired IO flow rate.

One or more of the following example features may be included. The multi-node storage system may include two storage nodes configured in an active-active system. Dividing a total IO flow rate limit between a plurality of storage nodes of a storage system may include dividing the total IO flow rate limit equally between a plurality of storage nodes of a storage system. Querying each storage node of the plurality of storage nodes for a desired IO flow rate may include querying each storage node of the plurality of storage nodes for the desired IO flow rate at a predefined interval. Querying each storage node of the plurality of storage nodes for a desired IO flow rate may include querying each storage node of the plurality of storage nodes for the desired IO flow rate in response to detecting a storage node failure. Defining, for each storage node, an updated IO flow rate limit based upon, at least in part, the total IO flow rate limit and the plurality of desired IO flow rates may include incrementally adjusting, for each storage node, the IO flow rate limit toward the updated IO flow rate limit. Defining, for each storage node, an updated IO flow rate limit based upon, at least in part, the total IO flow rate limit and the plurality of desired IO flow rates may include incrementally adjusting the plurality of updated IO flow rate limits toward a plurality of equal IO flow rate limits.

In another example implementation, a computer program product resides on a computer readable medium that has a plurality of instructions stored on it. When executed by a processor, the instructions cause the processor to perform operations that may include, but are not limited to, dividing a total IO flow rate limit between a plurality of storage nodes of a multi-node storage system. A total desired IO flow rate may be determined. Each storage node of the plurality of storage nodes may be queried for a desired IO flow rate, thus defining a plurality of desired IO flow rates. An updated IO flow rate limit may be defined, for each storage node, an updated IO flow rate limit based upon, at least in part, the total IO flow rate limit and the plurality of desired IO flow rates. One or more IO requests may be processed on the plurality of storage nodes based upon, at least in part, the updated IO flow rate limit defined for each storage node and the total desired IO flow rate.

One or more of the following example features may be included. The multi-node storage system may include two storage nodes configured in an active-active system. Dividing a total IO flow rate limit between a plurality of storage nodes of a storage system may include dividing the total IO flow rate limit equally between a plurality of storage nodes of a storage system. Querying each storage node of the plurality of storage nodes for a desired IO flow rate may include querying each storage node of the plurality of storage nodes for the desired IO flow rate at a predefined interval. Querying each storage node of the plurality of storage nodes for a desired IO flow rate may include querying each storage node of the plurality of storage nodes for the desired IO flow rate in response to detecting a storage node failure. Defining, for each storage node, an updated IO flow rate limit based upon, at least in part, the total IO flow rate limit and the plurality of desired IO flow rates may include incrementally adjusting, for each storage node, the IO flow rate limit toward the updated IO flow rate limit. Defining, for each storage node, an updated IO flow rate limit based upon, at least in part, the total IO flow rate limit and the plurality of desired IO flow rates may include incrementally adjusting the plurality of updated IO flow rate limits toward a plurality of equal IO flow rate limits.

In another example implementation, a computing system includes at least one processor and at least one memory architecture coupled with the at least one processor, wherein the at least one processor configured to divide a total IO flow rate limit between a plurality of storage nodes of a multi-node storage system. A total desired IO flow rate may be determined. Each storage node of the plurality of storage nodes may be queried for a desired IO flow rate, thus defining a plurality of desired IO flow rates. An updated IO flow rate limit may be defined, for each storage node, an updated IO flow rate limit based upon, at least in part, the total IO flow rate limit and the plurality of desired IO flow rates. One or more IO requests may be processed on the plurality of storage nodes based upon, at least in part, the updated IO flow rate limit defined for each storage node and the total desired IO flow rate.

One or more of the following example features may be included. The multi-node storage system may include two storage nodes configured in an active-active system. Dividing a total IO flow rate limit between a plurality of storage nodes of a storage system may include dividing the total IO flow rate limit equally between a plurality of storage nodes of a storage system. Querying each storage node of the plurality of storage nodes for a desired IO flow rate may include querying each storage node of the plurality of storage nodes for the desired IO flow rate at a predefined interval. Querying each storage node of the plurality of storage nodes for a desired IO flow rate may include querying each storage node of the plurality of storage nodes for the desired IO flow rate in response to detecting a storage node failure. Defining, for each storage node, an updated IO flow rate limit based upon, at least in part, the total IO flow rate limit and the plurality of desired IO flow rates may include incrementally adjusting, for each storage node, the IO flow rate limit toward the updated IO flow rate limit. Defining, for each storage node, an updated IO flow rate limit based upon, at least in part, the total IO flow rate limit and the plurality of desired IO flow rates may include incrementally adjusting the plurality of updated IO flow rate limits toward a plurality of equal IO flow rate limits.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
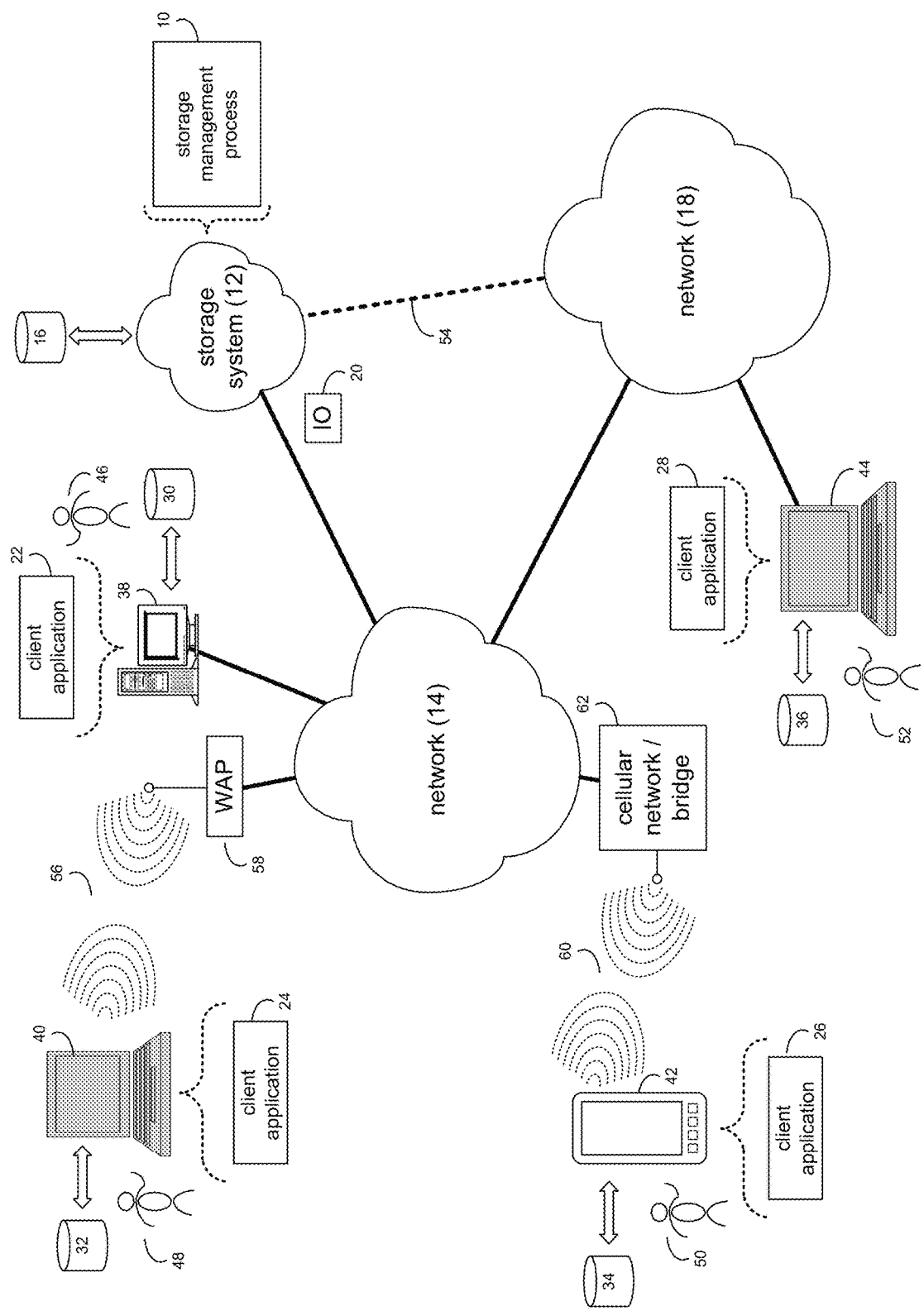
FIG. 1 is an example diagrammatic view of a storage system and a storage management process coupled to a distributed computing network according to one or more example implementations of the disclosure.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of storage management process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a storage management process, such as storage management process 10 of FIG. 1, may include but is not limited to, dividing a total IO flow rate limit between a plurality of storage nodes of a multi-node storage system. A total desired IO flow rate may be determined. Each storage node of the plurality of storage nodes may be queried for a desired IO flow rate, thus defining a plurality of desired IO flow rates. An updated IO flow rate limit may be defined, for each storage node, an updated IO flow rate limit based upon, at least in part, the total IO flow rate limit and the plurality of desired IO flow rates. One or more IO requests may be processed on the plurality of storage nodes based upon, at least in part, the updated IO flow rate limit defined for each storage node and the total desired IO flow rate.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
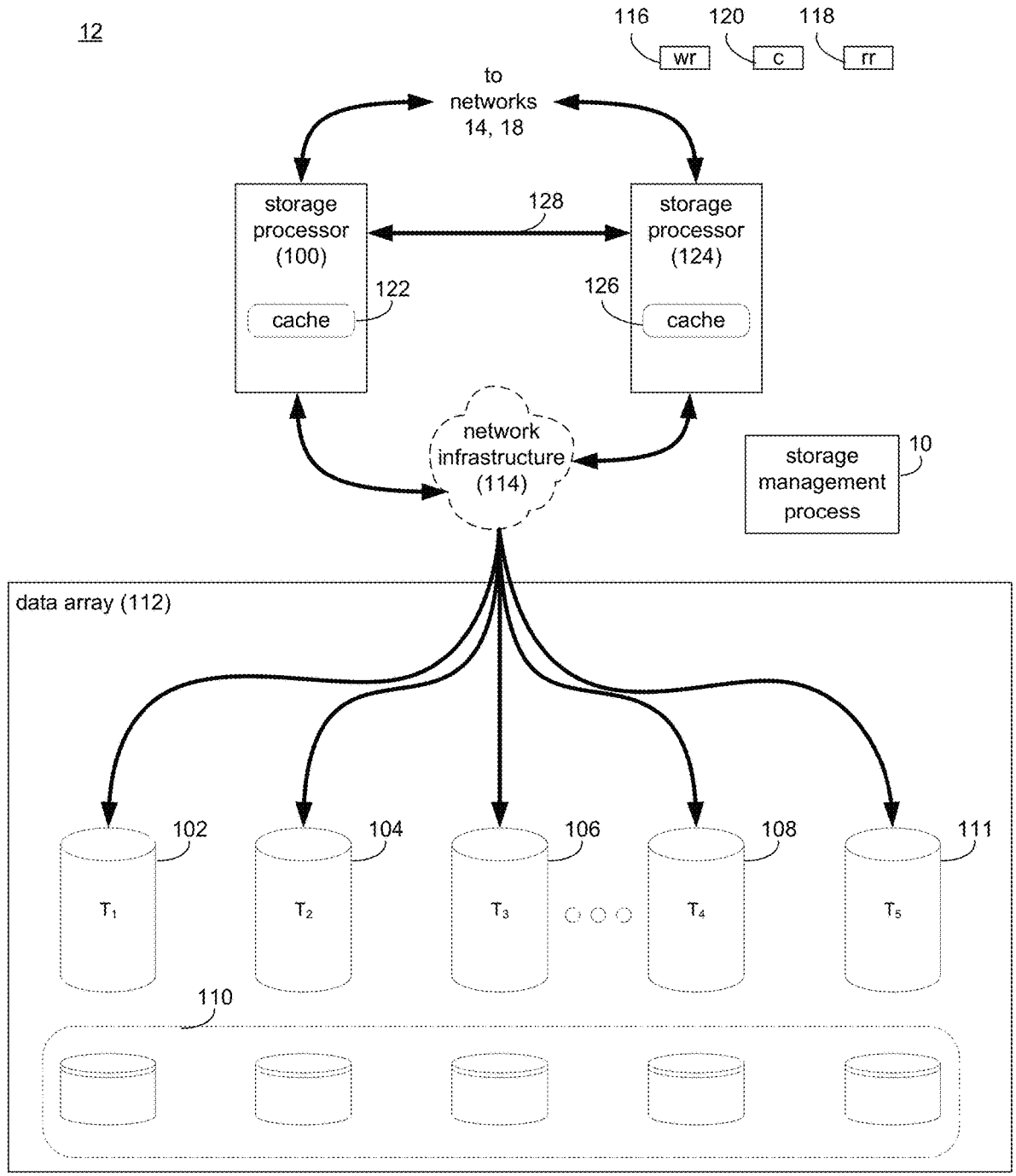
FIG. 2 is an example diagrammatic view of the storage system of FIG. 1 according to one or more example implementations of the disclosure.
Figure 3:
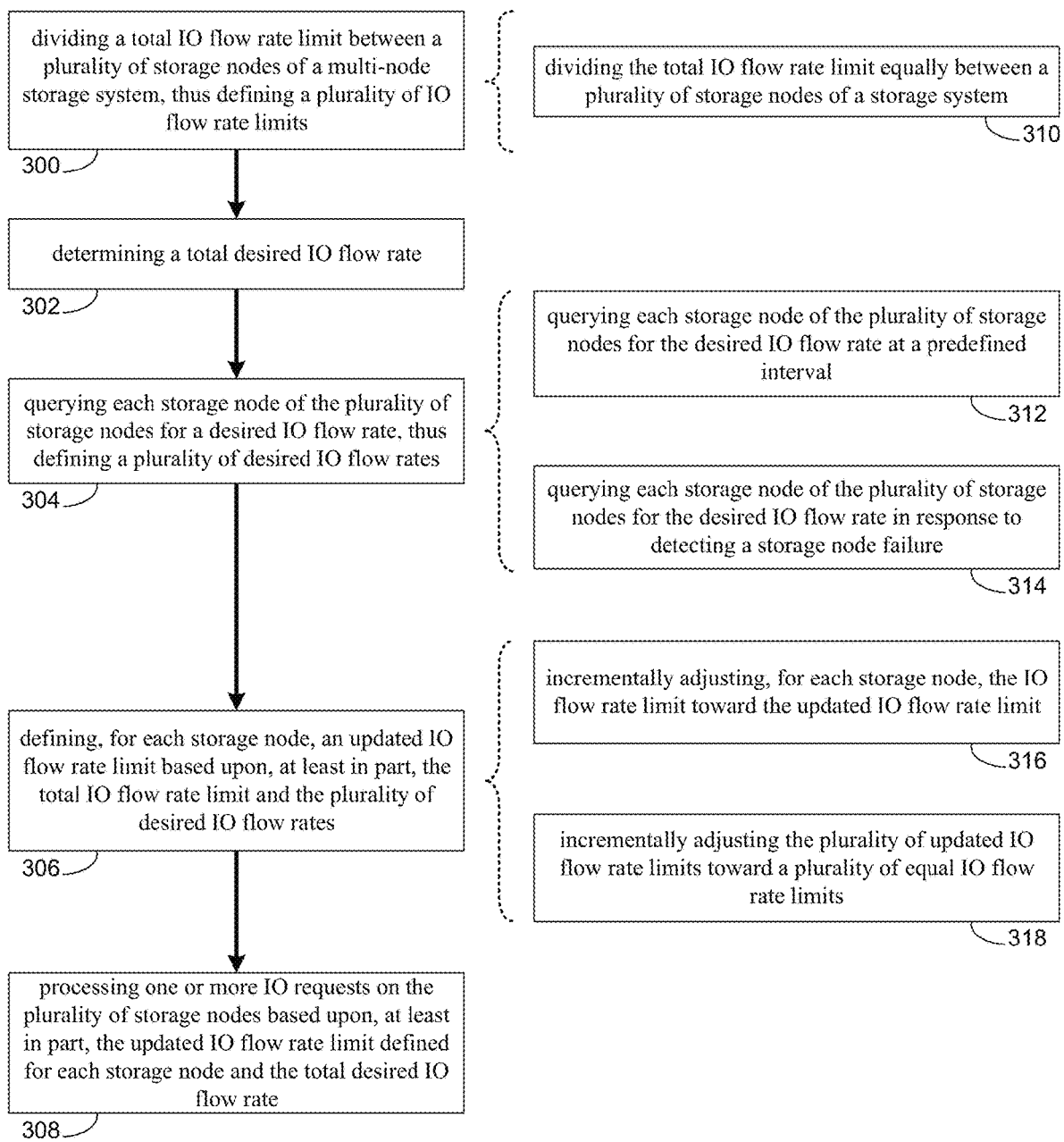
FIG. 3 is an example flowchart of storage management process according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage devices (e.g., storage devices 110) used to create the storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage devices used to create the storage targets. By mirroring data between storage devices, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 111. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 111), this is for example purposes only and is not intended to be a limitation of this disclosure. Specifically, the actual number of coded targets may be increased or decreased depending upon e.g. the level of redundancy/performance/capacity required.

Storage targets 102, 104, 106, 108 and coded target 111 may be created as volumes using one or more electro-mechanical hard disk drives and/or solid-state/flash devices (e.g., storage devices 110), wherein a combination of storage targets 102, 104, 106, 108 and coded target 111 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 111 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 111 may be a RAID device and/or computer-based hard disk drives. Further still, one or more of storage targets 102, 104, 106, 108 and/or coded target 111 may be a SAN.

In the event that storage system 12 is configured as a SAN, the various components of storage system 12 (e.g. storage processor 100, storage targets 102, 104, 106, 108, and coded target 111) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of storage management process 10. The instruction sets and subroutines of storage management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of storage management process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

As discussed above, the instruction sets and subroutines of storage management process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of storage management process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 111. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 111 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage processors 100, 124), both actively running the same kind of service(s) simultaneously. One purpose of an active-active cluster may be to achieve load balancing. Load balancing may distribute workloads across all nodes in order to prevent any single node from getting overloaded. Because there are more nodes available to serve, there will also be a marked improvement in throughput and response times. Another purpose of an active-active cluster may be to provide at least one active node in the event that one of the nodes in the active-active cluster fails.

In some implementations, storage processor 124 may function like storage processor 100. For example, during operation of storage processor 124, content 118 to be written to storage system 12 may be processed by storage processor 124. Additionally/alternatively and when storage processor 124 is configured as an application server, content 118 to be written to storage system 12 may be internally generated by storage processor 124.

Storage processor 124 may include frontend cache memory system 126. Examples of frontend cache memory system 126 may include but are not limited to a volatile, solid-state, cache memory system (e.g., a dynamic RAM cache memory system) and/or a non-volatile, solid-state, cache memory system (e.g., a flash-based, cache memory system).

Storage processor 124 may initially store content 118 within frontend cache memory system 124. Depending upon the manner in which frontend cache memory system 126 is configured, storage processor 124 may immediately write content 118 to data array 112 (if frontend cache memory system 126 is configured as a write-through cache) or may subsequently write content 118 to data array 112 (if frontend cache memory system 126 is configured as a write-back cache).

In some implementations, the instruction sets and subroutines of node fencing process 10, which may be stored on storage device 16 included within storage system 12, may be executed by one or more processors (not shown) and one or more memory architectures (not shown) included within storage system 12. Accordingly, in addition to being executed on storage processor 124, some or all of the instruction sets and subroutines of node fencing 10 may be executed by one or more processors (not shown) and one or more memory architectures (not shown) included within data array 112.

Further and as discussed above, during the operation of data array 112, content (e.g., content 118) to be written to data array 112 may be received from storage processor 124 and initially stored within backend cache memory system 124 prior to being stored on e.g. one or more of storage targets 102, 104, 106, 108, 111. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 111 (which would typically be slower).

As discussed above, storage processor 100 and storage processor 124 may be configured in an active/active configuration where processing of data by one storage processor may be synchronized to the other storage processor. For example, data may be synchronized between each storage processor via a separate link or connection (e.g., connection 128).

The Storage Management Process:

Referring also to the examples of FIGS. 3-6 and in some implementations, storage management process 10 may divide 300 a total IO flow rate limit between a plurality of storage nodes of a multi-node storage system. A total desired IO flow rate may be determined 302. Each storage node of the plurality of storage nodes may be queried 304 for a desired IO flow rate, thus defining a plurality of desired IO flow rates. An updated IO flow rate limit may be defined 306, for each storage node, an updated IO flow rate limit based upon, at least in part, the total IO flow rate limit and the plurality of desired IO flow rates. One or more IO requests may be processed 308 on the plurality of storage nodes based upon, at least in part, the updated IO flow rate limit defined for each storage node and the total desired IO flow rate.

As will be discussed in greater detail below, storage management process 10 may address challenges with conventional approaches to IO flow rates to shared storage resources of a multi-node system. For example, in a multi-node storage system, a host can connect to the storage system through multiple nodes and have all storage resources serviced by each node. However, when IO requests associated with the storage resources are handled by different storage nodes, each storage node is generally aware of some IO flow limit. As such, each storage node of these conventional systems would apply some limit on its portion of processing data, in such a way that total IO flow of the data on all nodes doesn't exceed configured limit. However, these conventional approaches do not allow multiple storage nodes of a multi-node storage system to "know" its portion of the total IO flow. For example, suppose a multi-storage node includes e.g., two storage nodes. In this example, each storage node may process IO requests associated with a particular storage object (e.g., a volume). In this example, suppose that the IO flow limit for the volume is e.g., 10 gigabytes per second (10 Gb/s) and that the desired IO flow is e.g., 20 Gb/s with e.g., 90% of the IO flow through one storage node and e.g., 10% of the IO flow through another storage node. In this example, conventional approaches may give equal IO flow rates to each storage node (e.g., 5 Gb/s limit per storage node). In this example, however, the first node may limit IO flow to e.g., 5 Gb/s and the second node may limit IO flow to 10% of 20 Gb/s or 2 Gb/s, resulting in 7 Gb/s IO flow. As this configuration wastes 3 Gb/s, conventional approaches introduce inefficiencies.

As will be discussed in greater detail below, implementations of the present disclosure may allow for coordination among the storage nodes that may dynamically adapt to the abilities of each storage node in near real-time. In this manner, the processing capability of the multi-node storage system may be improved by limiting wasted IO flow between storage nodes of a multi-node storage system.

In some implementations, storage management process 10 may divide 300 a total IO flow rate limit between a plurality of storage nodes of a multi-node storage system, thus defining a plurality of IO flow rate limits. In some implementations a total IO flow rate may define the rate at which IO operations or requests are processed on a storage object in a multi-node storage system. An example of a storage object may include, but is not limited to, a volume. A volume may generally include a logical memory device configured for storing data. In some implementations, a volume may be accessible by multiple nodes of a multi-node storage system. As shown in the example of FIG. 2 and in some implementations, a volume may be generated for a storage system (e.g., mapped to underlying physical memory). In some implementations, multiple nodes may access the volume and may present the volume to one or more hosts (e.g., client devices 38, 40, 42, 44). In this manner, a host may access a volume with multiple nodes. In some implementations, a volume may have a storage capacity that determines how much data may be stored in the volume.

As discussed above, the total IO flow rate limit may be defined for each storage object and/or for a group of storage objects. In some implementations, the total IO flow rate limit may be a default value, a user-defined value, and/or value determined/assigned by storage management process 10. For example, storage management process 10 may receive or define a total IO flow rate limit as a quality of service (QoS) setting that may be defined when a storage object is created or assigned to a particular customer. The total IO flow rate limit may be constrained by the processing capacity of the multi-node storage system. For example, when defining the total IO flow rate limit, storage management process 10 may determine the processing capacity of the multi-node storage system. Additionally and/or alternatively, when creating a storage object, a user may define the QoS setting or level for the storage object which may provide a default and/or predefined total IO flow rate limit for the storage object.

Figure 4:
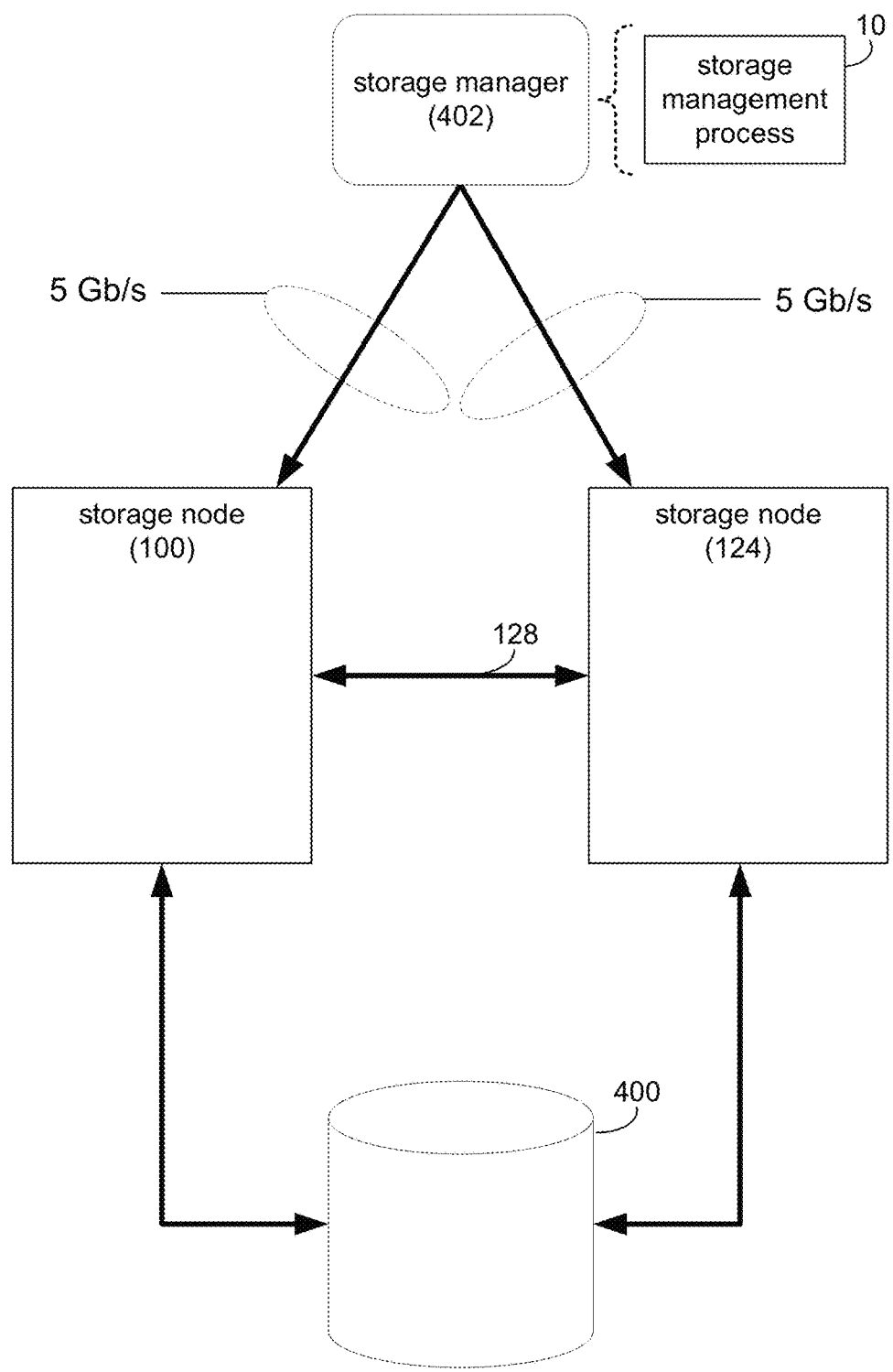
FIGS. 4-6 are example diagrammatic views of the storage system of FIG. 1 according to one or more example implementations of the disclosure.

Referring also to FIG. 4, suppose that a multi-node storage system (storage system 12) includes e.g., two storage nodes (e.g., storage nodes 100, 124). In some implementations, the multi-node storage system may include two storage nodes configured in an active-active system. In this example, multi-node storage system 12 may define a "Federation" composed of multiple storage nodes or and one or more storage objects (e.g., volume 400) that can be accessed from either storage node. In some implementations, a total IO flow rate may be defined for volume 400 that limits the maximum IO processing rate or flow by multi-node storage system 12. As each storage node (e.g., storage nodes 100, 124) can access volume 400, storage management process 10 may divide 300 the total IO flow rate limit between the plurality of storage nodes (e.g., storage nodes 100, 124). While an example of e.g., two storage nodes has been provided, it will be appreciated that this is for example purposes only and that the multi-node storage system may include any number of storage nodes within the scope of the present disclosure.

In some implementations, dividing 300 a total IO flow rate limit between a plurality of storage nodes of a storage system may include dividing 310 the total IO flow limit rate equally between a plurality of storage nodes of a storage system. For example, storage management process 10 may provide or receive an initial total IO flow rate limit for a storage object or group of storage objects. Referring again to the example of FIG. 4, storage management process 10 may be implemented via a storage manager (e.g., storage manager 402). A storage manager may generally include a software, hardware, or combination thereof that is configured to interface with each storage node of a multi-node storage system. In some implementations, storage manager 402 may be a driver deployed on a host; deployed within a multi-node storage system; and/or deployed externally to the host and the multi-node storage system. In this manner, storage manager 402 may be deployed in any system that has access to each storage node (e.g., storage nodes 100, 124) of multi-node storage system 12. Storage manager 402 may communicate the IO flow rate limits to storage node 100 and storage node 124.

Suppose that storage management process 10 receives or defines a total IO flow rate limit for volume 400 of e.g., 10 Gb/s. Storage management process 10 may, via storage manager 402, divide 310 the total IO flow rate limit equally between the plurality of storage nodes (e.g., storage nodes 100, 124). In this example, storage management process 10 may, via storage manager 402, divide 310 the total IO flow rate limit of e.g., 10 Gb/s equally between storage nodes 100, 124 such that each storage node has a IO flow rate limit of e.g., 5 Gb/s. While an example of e.g., two storage nodes has been discussed, it will be appreciated that any total IO flow rate limit may be divided 310 equally between the plurality of storage nodes of the storage system within the scope of the present disclosure.

In some implementations and in response to dividing 300 the total IO flow rate limit between the plurality of storage nodes, storage management process 10 may communicate these respective IO flow rate limits to each storage node. In this example, storage manager 402 may communicate an IO flow rate limit of 5 Gb/s for storage node 100 in its processing of IO requests for volume 400 and may communicate an IO flow rate limit of 5 Gb/s for storage node 125 in its processing of IO requests for volume 400.

Figure 5:
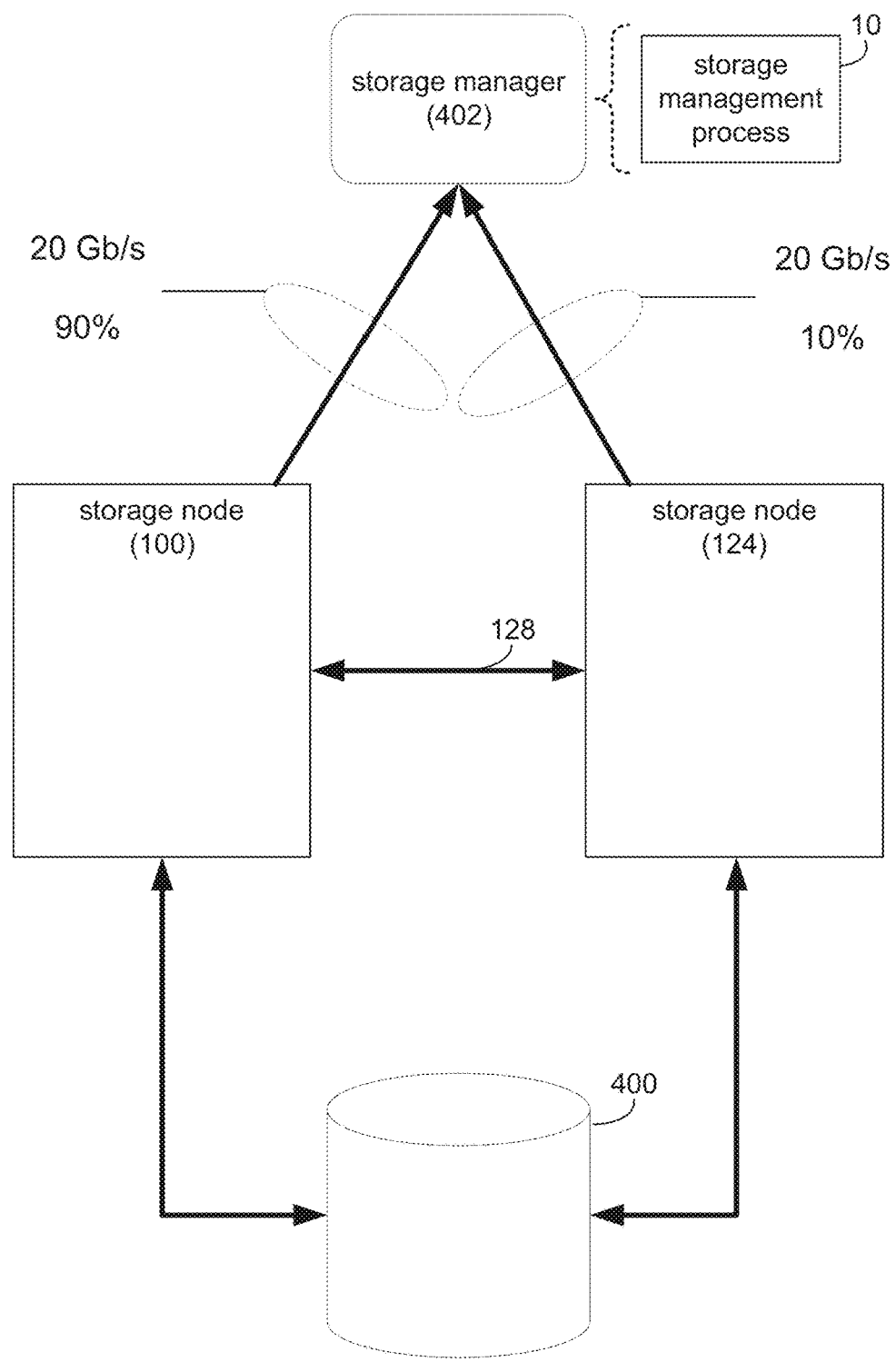
Figure 6:
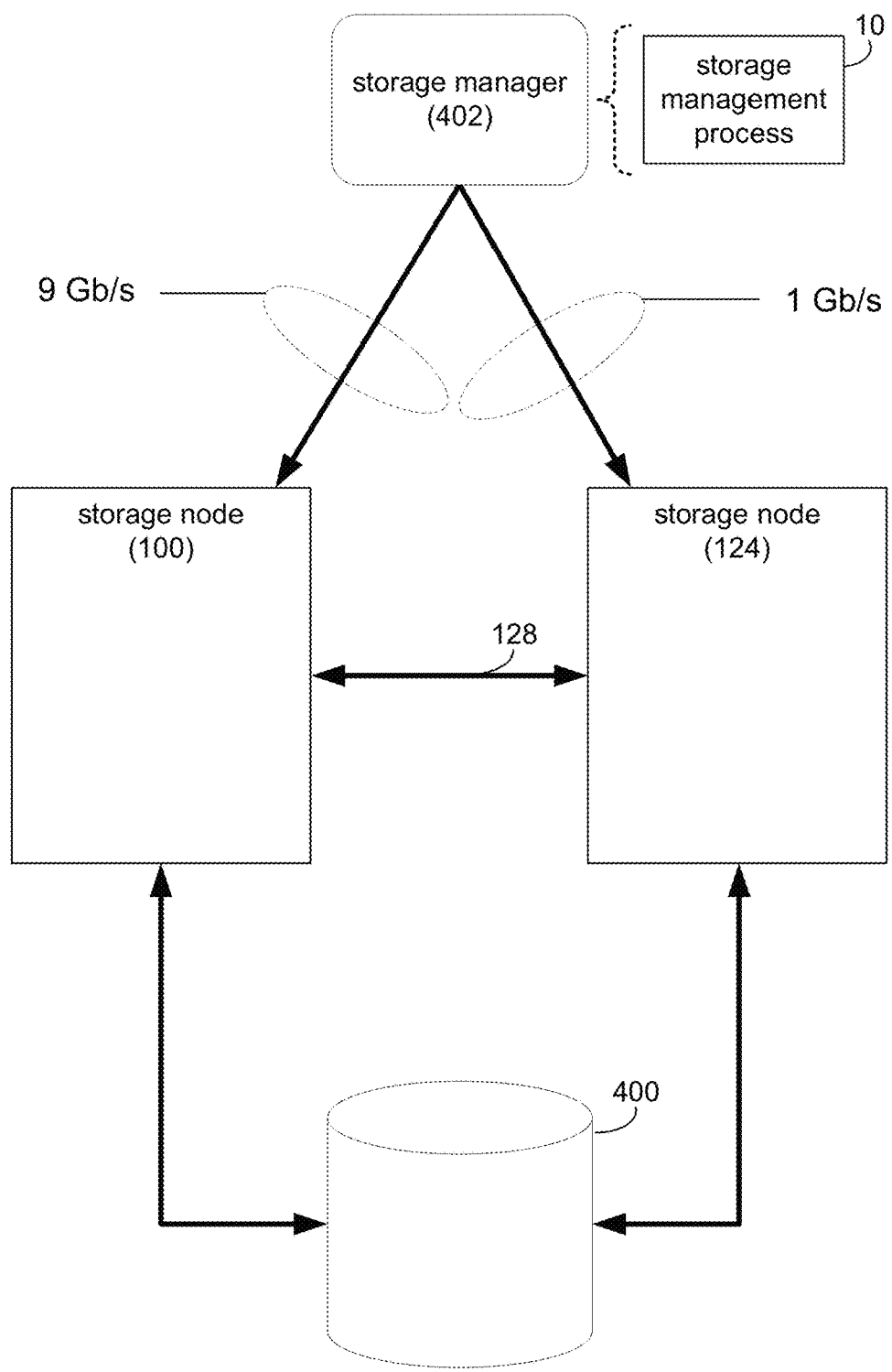

In some implementations, storage management process 10 may determine 302 a total desired IO flow rate. A total desired IO flow rate may generally include the common IO flow rate at which a host and the multi-node storage system can process IO requests at for a particular storage object. For example, the total desired IO flow rate may be defined as a quality of service (QoS) setting when a storage object is created and/or may be defined or redefined for the storage object at any point in time. The total desired IO flow rate may be a default value, a user-defined value, and/or an automatically determined value. Referring also to FIG. 5, storage management process 10 may determine 302 a total desired IO flow rate of e.g., 20 Gb/s for volume 400 by communicating with either or both storage nodes (e.g., storage nodes 100, 124) and/or by utilizing a database or other memory structure with total desired IO flow rates for particular storage objects (e.g., a QoS setting defining a total desired IO flow rate). While an example of e.g., 20 Gb/s has been described for volume 400, it will be appreciated that this is for example purposes only and that any total desired IO flow rate may be determined within the scope of the present disclosure.

In some implementations, storage management process 10 may query 304 each storage node of the plurality of storage nodes for a desired IO flow rate, thus defining a plurality of desired IO flow rates. The desired IO flow rate of a particular storage node may be independently determined for each storage node of the multi-node storage system. As will be discussed in greater detail below, the desired IO flow rate may be based upon, at least in part, a desired IO flow rate division. For example, as a host provides IO requests to storage system 12, storage node 100 may be configured to operate as a primary node while storage node 124 may be configured to operate as a secondary node. As such, storage node 100 may be configured to process the majority of IO requests associated with volume 400 and storage node 124 may be configured to process a minority of IO requests associated with volume 400. In one example, suppose storage node 100 has a desired IO flow rate of e.g., 90% of the IO requests associated with volume 400 and that storage node 124 has a desired IO flow rate of e.g., 10% of the IO requests associated with volume 400. Accordingly, when querying each storage node of the plurality of storage nodes for a desired IO flow rate may include querying a desired IO flow rate division (e.g., 90% of the IO flow rate via storage node 100 and 10% of the IO flow rate via storage node 124) from the plurality of storage nodes.

Querying 302 each storage node of the plurality of storage nodes for a desired IO flow rate may include querying 312 each storage node of the plurality of storage nodes for the desired IO flow rate at a predefined interval. For example, storage management process 10 may query 312 each storage node of the plurality of storage nodes at a predefined interval. The predefined interval may be a default periodic interval, a user-defined interval, and/or an automatically defined interval. In some implementations, the time needed for detecting desired IO flow rates and updating the plurality of storage nodes is relatively short compared to stable intervals. In one example, storage management process 10 may, via storage manager 402, query 312 each storage node of the plurality of storage nodes for the desired IO flow rate every e.g., 5 to 10 seconds. However, it will be appreciated that storage management process 10 may query 312 each storage node for the desired IO flow rate at any interval within the scope of the present disclosure.

Querying 302 each storage node of the plurality of storage nodes for a desired IO flow rate may include querying 314 each storage node of the plurality of storage nodes for the desired IO flow rate in response to detecting a storage node failure. For example, storage management process 10 may, via storage manager 402, receive storage node failover and failback events. In response to receiving these storage node failure events, storage management process 10 may query 312 each storage node of the plurality of storage nodes by excluding a failed storage node from and/or adding a recovered storage node. Storage management process 10 may exclude the number of failed storage nodes from and/or add the number of recovered storage nodes to the number of active storage nodes and, as will be discussed in greater detail below, recalculate the IO flow rate limit for each storage node.

In some implementations, storage management process 10 may define 306, for each storage node, an updated IO flow rate limit based upon, at least in part, the total IO flow rate limit and the plurality of desired IO flow rates. For example, storage management process 10 may utilize the total IO flow rate limit, the total desired IO flow rate, and the plurality of desired IO flow rates for the plurality of storage nodes to define 306, for each storage node, an updated IO flow rate limit. Continuing with the above example and referring also to FIG. 6, suppose that the total IO flow rate limit for volume 400 is e.g., 10 Gb/s; the total desired IO flow rate is e.g., 20 Gb/s for volume 400; and the desired IO flow rate for storage node 100 is e.g., 90% and the desired IO flow rate for storage node 124 is e.g., 10%. In this example, storage management process 10 may define 306 the updated IO flow rate limit for storage node 100 by multiplying the prior total IO flow rate limit by the desired IO flow rate (e.g., 10 Gb/s*90%=9 Gb/s) and the IO flow rate limit for storage node 124 by multiplying the prior total IO flow rate limit by the desired IO flow rate (e.g., 10 Gb/s*10%=1 Gb/s). Accordingly, storage management process 10 may maintain the total IO flow rate limit while minimizing the wasted IO flow rate by updating the IO flow rate limits for each storage node based upon, at least in part, each node's desired IO flow rate.

Defining 306 for each storage node, an updated IO flow rate limit based upon, at least in part, the total IO flow rate limit and the plurality of desired IO flow rates may include incrementally adjusting 316, for each storage node, the IO flow rate limit toward the updated IO flow rate limit. For example, if and when changes are detected in the plurality of desired IO flow rates for the plurality of storage nodes, storage management process 10 may, via storage manager 402, incrementally adjust 316 the IO flow rate limit of a particular storage node toward the updated IO flow rate limit. For example, if on some storage node (e.g., storage node 100), the desired IO flow rate significantly increases, the corresponding portion of that storage node's IO flow rate limit may be increased by a lower value (e.g., the mean value between the previous IO flow rate limit and the updated IO flow rate limit). On the next querying of the plurality of storage nodes, the storage node's IO flow rate limit may be increased again. This process may repeat until the IO flow rate limit converges to the updated IO flow rate limit defined 306 for the storage node. While an example has been described using a mean value between the previous IO flow rate limit and the updated IO flow rate limit, it will be appreciated that this is for example purposes only and that any multiplier or other factor may be used to determine the incremental adjustment value for the IO flow rate limit within the scope of the present disclosure.

Defining 306, for each storage node, an updated IO flow rate limit based upon, at least in part, the total IO flow rate limit and the plurality of desired IO flow rates may include incrementally adjusting 318 the plurality of updated IO flow rate limits toward a plurality of equal IO flow rate limits. For example, suppose that after a temporary disbalance, the IO flow rate limits were changed from e.g., 5 Gb/s for each storage node to e.g., 6 Gb/s for storage node 100 and e.g., 4 Gb/s for storage node 124. Storage management process 10 may be configured to incrementally adjust 318 the plurality of updated IO flow rate limits toward a predefined distribution. For example, it may be desirable to utilize multiple storage nodes equally over time (e.g., to avoid overloading one storage node over others). In this example, storage management process 10 may incrementally adjust 318 the IO flow rate limits toward an equal distribution across the plurality of storage nodes. In one example, storage management process 10 may try to make IO flow rate limits for each node closer to each other by giving the storage node with a lower IO flow rate limit an increased IO flow rate limit. Continuing with the above example, storage management process 10 may incrementally adjust 318 the updated IO flow rate for storage node 124 from e.g., 40%/4 Gb/s to 45%/4.5 Gb/s. While an example of incrementally adjusting by e.g., 5% has been described, it will be appreciated that this is for example purposes only and that any increment may be used within the scope of the present disclosure.

In some implementations, storage management process 10 may process 308 one or more IO requests on the plurality of storage nodes based upon, at least in part, the updated IO flow rate limit defined for each storage node and the total desired IO flow rate. Returning to the above example where storage management process 10 defines 306 the updated IO flow rate limit for storage node 100 is e.g., 9 Gb/s and the updated IO flow rate limit for storage node 124 is e.g., 1 Gb/s. In this example, storage management process 10 may process 308 one or more IO requests (e.g., IO request 20) on the plurality of storage nodes (e.g., storage nodes 100, 124) using the updated IO flow rate limits (e.g., 9 Gb/s for storage node 100 and 1 Gb/s for storage node 124) and the total desired IO flow rate (e.g., 20 Gb/s). In this example, storage management process 10 may process 308 one or more IO requests on storage node 100 at the IO flow rate of 9 Gb/s by multiplying the total desired IO flow by the desired IO flow rate for storage node 100 and limiting the resulting IO flow rate by the updated IO flow rate limit for storage node 100 (i.e., 20 Gb/s*90%-9 Gb/s=9 Gb/s). Similarly, storage management process 10 may process 308 one or more IO requests on storage node 124 at the IO flow rate of 1 Gb/s by multiplying the total desired IO flow by the desired IO flow rate for storage node 124 and limiting the resulting IO flow rate by the updated IO flow rate limit for storage node 124 (i.e., 20 Gb/s*10%-1 Gb/s=1 Gb/s). Compared to conventional approaches where the IO flow rate is reduced to lower than the total IO flow rate limit (i.e., 7 Gb/s), storage management process 10 may utilize the entire IO flow rate limit of 10 Gb/s. In this manner, the ability for a multi-node storage system to provide optimal IO flow rates using a plurality of storage nodes may be improved.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
    dividing a total IO flow rate limit between a plurality of storage nodes of a multi-node storage system, wherein the total IO flow rate limit as a total IO flow rate between a storage object and the plurality of storage nodes and is defined per storage object accessible by each of the plurality of storage nodes, thus defining a plurality of IO flow rate limits;
    determining a total desired IO flow rate;
    querying each storage node of the plurality of storage nodes for a desired IO flow rate, thus defining a plurality of desired IO flow rates;
    defining, for each storage node, an updated IO flow rate limit based upon, at least in part, the total IO flow rate limit and the plurality of desired IO flow rates; and
    processing one or more IO requests on the plurality of storage nodes based upon, at least in part, the updated IO flow rate limit defined for each storage node and the total desired IO flow rate includes processing the one or more IO requests on at least one storage node of the plurality of storage nodes at the updated IO flow rate by multiplying the total desired IO flow rate by the desired IO flow rate for the at least one storage node and limiting a resulting IO flow rate by the updated IO flow rate limit for the at least one storage node.

2. The computer-implemented method of claim 1, wherein the multi-node storage system includes two storage nodes configured in an active-active system.

3. The computer-implemented method of claim 1, wherein dividing a total IO flow rate limit between a plurality of storage nodes of a storage system includes:
    dividing the total IO flow rate limit equally between a plurality of storage nodes of a storage system.

4. The computer-implemented method of claim 1, wherein querying each storage node of the plurality of storage nodes for a desired IO flow rate includes:
    querying each storage node of the plurality of storage nodes for the desired IO flow rate at a predefined interval.

5. The computer-implemented method of claim 1, wherein querying each storage node of the plurality of storage nodes for a desired IO flow rate includes:
    querying each storage node of the plurality of storage nodes for the desired IO flow rate in response to detecting a storage node failure.

6. The computer-implemented method of claim 1, wherein defining, for each storage node, an updated IO flow rate limit based upon, at least in part, the total IO flow rate limit and the plurality of desired IO flow rates includes:
    incrementally adjusting, for each storage node, the IO flow rate limit toward the updated IO flow rate limit.

7. The computer-implemented method of claim 1, wherein defining, for each storage node, an updated IO flow rate limit based upon, at least in part, the total IO flow rate limit and the plurality of desired IO flow rates includes:
    incrementally adjusting the plurality of updated IO flow rate limits toward a plurality of equal IO flow rate limits.

8. A computer program product residing on a non-transitory computer readable medium having a plurality of instructions stored thereon which, when executed by a processor, cause the processor to perform operations comprising:

dividing a total IO flow rate limit between a plurality of storage nodes of a multi-node storage system, wherein the total IO flow rate limit as a total IO flow rate between a storage object and the plurality of storage nodes and is defined per storage object accessible by each of the plurality of storage nodes, thus defining a plurality of IO flow rate limits;

determining a total desired IO flow rate;

querying each storage node of the plurality of storage nodes for a desired IO flow rate, thus defining a plurality of desired IO flow rates;

defining, for each storage node, an updated IO flow rate limit based upon, at least in part, the total IO flow rate limit and the plurality of desired IO flow rates; and processing one or more IO requests on the plurality of storage nodes based upon, at least in part, the updated IO flow rate limit defined for each storage node and the total desired IO flow rate includes processing the one or more IO requests on at least one storage node of the plurality of storage nodes at the updated IO flow rate by multiplying the total desired IO flow rate by the desired IO flow rate for the at least one storage node and limiting a resulting IO flow rate by the updated IO flow rate limit for the at least one storage node.

9. The computer program product of claim 8, wherein the multi-node storage system includes two storage nodes configured in an active-active system.

10. The computer program product of claim 8, wherein dividing a total IO flow rate limit between a plurality of storage nodes of a storage system includes:

dividing the total IO flow rate limit equally between a plurality of storage nodes of a storage system.

11. The computer program product of claim 8, wherein querying each storage node of the plurality of storage nodes for a desired IO flow rate includes:

querying each storage node of the plurality of storage nodes for the desired IO flow rate at a predefined interval.

12. The computer program product of claim 8, wherein querying each storage node of the plurality of storage nodes for a desired IO flow rate includes:

querying each storage node of the plurality of storage nodes for the desired IO flow rate in response to detecting a storage node failure.

13. The computer program product of claim 8, wherein defining, for each storage node, an updated IO flow rate limit based upon, at least in part, the total IO flow rate limit and the plurality of desired IO flow rates includes:

incrementally adjusting, for each storage node, the IO flow rate limit toward the updated IO flow rate limit.

14. The computer program product of claim 8, wherein defining, for each storage node, an updated IO flow rate limit based upon, at least in part, the total IO flow rate limit and the plurality of desired IO flow rates includes:

incrementally adjusting the plurality of updated IO flow rate limits toward a plurality of equal IO flow rate limits.

15. A computing system comprising:

a memory; and a processor configured to divide a total IO flow rate limit between a plurality of storage nodes of a multi-node storage system, thus defining a plurality of IO flow rate limits, wherein the total IO flow rate limit as a total IO flow rate between a storage object and the plurality of storage nodes and is defined per storage object accessible by each of the plurality of storage nodes, wherein the processor is further configured to determine a total desired IO flow rate, wherein the processor is further configured to query each storage node of the plurality of storage nodes for a desired IO flow rate, thus defining a plurality of desired IO flow rates, wherein the processor is further configured to define, for each storage node, an updated IO flow rate limit based upon, at least in part, the total IO flow rate limit and the plurality of desired IO flow rates, and wherein the processor is further configured to process one or more IO requests on the plurality of storage nodes based upon, at least in part, the updated IO flow rate limit defined for each storage node and the total desired IO flow rate which includes processing the one or more IO requests on at least one storage node of the plurality of storage nodes at the updated IO flow rate by multiplying the total desired IO flow rate by the desired IO flow rate for the at least one storage node and limiting a resulting IO flow rate by the updated IO flow rate limit for the at least one storage node.

16. The computing system of claim 15, wherein the multi-node storage system includes two storage nodes configured in an active-active system.

17. The computing system of claim 15, wherein dividing a total IO flow rate limit between a plurality of storage nodes of a storage system includes:

dividing the total IO flow rate limit equally between a plurality of storage nodes of a storage system.

18. The computing system of claim 15, wherein querying each storage node of the plurality of storage nodes for a desired IO flow rate includes:

querying each storage node of the plurality of storage nodes for the desired IO flow rate at a predefined interval.

19. The computing system of claim 15, wherein querying each storage node of the plurality of storage nodes for a desired IO flow rate includes:

querying each storage node of the plurality of storage nodes for the desired IO flow rate in response to detecting a storage node failure.

20. The computing system of claim 15, wherein defining, for each storage node, an updated IO flow rate limit based upon, at least in part, the total IO flow rate limit and the plurality of desired IO flow rates includes:

incrementally adjusting, for each storage node, the IO flow rate limit toward the updated IO flow rate limit.

* * * * *